US005606595A

United States Patent [19]
Ejzak

[11] Patent Number: 5,606,595
[45] Date of Patent: Feb. 25, 1997

[54] EQUAL ACCESS TO INTER-EXCHANGE CARRIERS IN A MOBILE WIRELESS PACKET DATA COMMUNICATION SYSTEM

[75] Inventor: Richard P. Ejzak, Wheaton, Ill.

[73] Assignee: Lucent Technologies Inc., Murray Hill, N.J.

[21] Appl. No.: 293,274

[22] Filed: Aug. 19, 1994

[51] Int. Cl.⁶ .................................................. H04Q 7/20
[52] U.S. Cl. ........................... 379/58; 370/294; 379/220
[58] Field of Search ............................ 379/58, 59, 63, 379/207, 220, 219, 221, 201; 455/33.1, 54.1; 370/95.1, 94.1, 110.1

[56] References Cited

U.S. PATENT DOCUMENTS

| | | | |
|---|---|---|---|
| 4,565,903 | 1/1986 | Riley | 379/220 |
| 4,791,665 | 12/1988 | Bogart et al. | |
| 4,866,763 | 9/1989 | Cooper et al. | 379/221 |
| 5,173,933 | 12/1992 | Jabs et al. | 379/58 |
| 5,311,586 | 5/1994 | Bogart et al. | 379/207 |
| 5,345,498 | 9/1994 | Mauger | 379/59 |
| 5,371,782 | 12/1994 | Casey, III et al. | 379/58 |
| 5,404,392 | 4/1995 | Miller et al. | 379/59 |
| 5,406,620 | 4/1995 | Pei | 379/220 |
| 5,475,749 | 12/1995 | Akinpelu et al. | 379/221 |
| 5,533,019 | 7/1996 | Jayapalan | 370/95.1 X |
| 5,533,029 | 7/1996 | Gardner | 370/94.1 |

OTHER PUBLICATIONS

"Cellular Mobile Radio as an Intelligent Network Application" M. Ballaro et al. *Electrical Communication*, vol. 63, No. 4; 1989.

"Cellular Digital Packet Data System Specification," Release 1.0, Book I of V, vol. 1, Jul. 19, 1993, pp. 100-1—100-8, 101-1—101-18, 102-1—102-22, 407-1—407-16, 500-1—500-12, 501-1—501-22, 613-1—613-8, 630-7—630-16.

*Primary Examiner*—Curtis Kuntz
*Assistant Examiner*—William G. Trost

[57] ABSTRACT

The present invention discloses an improvement to a wireless packet data communication system by permitting a subscriber using a mobile end system (M-ES) to select the inter-exchange carrier (IXC) which will carry the data over those network paths for which the subscriber bears the cost during a particular communication session. The present invention allows the subscriber to specify a preferred inter-exchange carrier in an optional preferred IXC field added to an end system hello message. During registration and authorization procedures, an identifier corresponding to the preferred inter-exchange carrier is transmitted between a serving mobile data intermediate system (MD-IS) and a home MD-IS in a preferred IXC field added to standard registration protocol messages. If the subscriber has specified a preferred inter-exchange carrier in the preferred IXC field, then this preferred inter-exchange carrier is given higher priority than a default preferred inter-exchange carrier selected when the user subscribes to the network services. Each MD-IS is provided with a new database that maps inter-exchange carrier identifiers to a corresponding boundary router address associated with the preferred inter-exchange carrier in order to route data packets via the subscriber's preferred IXC. The present invention thus allows data to be sent over the subscriber's preferred inter-exchange carrier on paths in both the forward and reverse directions on a per session basis.

23 Claims, 3 Drawing Sheets

FIG. 3

| BIT | 8 | 7 | 6 | 5 | 4 | 3 | 2 | 1 |
|---|---|---|---|---|---|---|---|---|
| OCTET 1 | colspan="8" PDU TYPE = ESH |||||||||
| OCTET 2 | SOURCE ADDRESS LENGTH ||||||||
| OCTET 3 | SOURCE NETWORK ADDRESS ||||||||
| ... | ||||||||
| OCTET N | ||||||||
| OCTET N+1 | IXC PREFERENCE ||||||||
| OCTET N+2 | ||||||||
| ... | ||||||||
| OCTET M | ||||||||

FIG. 4

| BIT | 8 | 7 | 6 | 5 | 4 | 3 | 2 | 1 |
|---|---|---|---|---|---|---|---|---|
| OCTET 1 | PDU TYPE = RDR ||||||||
| OCTET 2 | SOURCE ADDRESS LENGTH ||||||||
| OCTET 3 | SOURCE NETWORK ADDRESS ||||||||
| OCTET 4 | ||||||||
| ... | ||||||||
| OCTET N | ||||||||
| OCTET N+1 | FORWARDING ADDRESS LENGTH ||||||||
| OCTET N+2 | FORWARDING NETWORK ADDRESS ||||||||
| ... | ||||||||
| OCTET M | ||||||||
| OCTET M+1 | IXC PREFERENCE ||||||||
| ... | ||||||||
| OCTET P | ||||||||

FIG. 5

| BIT | 8 | 7 | 6 | 5 | 4 | 3 | 2 | 1 |
|---|---|---|---|---|---|---|---|---|
| OCTET 1 | PDU TYPE = RDC | | | | | | | |
| OCTET 2 | DESTINATION ADDRESS LENGTH | | | | | | | |
| OCTET 3 | DESTINATION NETWORK ADDRESS | | | | | | | |
| OCTET 4 | | | | | | | | |
| ... | | | | | | | | |
| OCTET N | | | | | | | | |
| OCTET N+1 | IXC PREFERENCE | | | | | | | |
| ... | | | | | | | | |
| OCTET M | | | | | | | | |

600

|  | IXC NO. 1 IDENTIFIER | IXC NO. 2 IDENTIFIER | ... | IXC NO. N IDENTIFIER |
|---|---|---|---|---|
| CELL NO. 1 | BOUNDARY ROUTER ADDRESS (1, 1) | BOUNDARY ROUTER ADDRESS (2, 1) | ... | BOUNDARY ROUTER ADDRESS (N, 1) |
| CELL NO. 2 | BOUNDARY ROUTER ADDRESS (1, 2) | BOUNDARY ROUTER ADDRESS (2, 2) | ... | BOUNDARY ROUTER ADDRESS (N, 2) |
| ... | ... | ... | ... | ... |
| CELL NO. M | BOUNDARY ROUTER ADDRESS (1, M) | BOUNDARY ROUTER ADDRESS (2, M) | ... | BOUNDARY ROUTER ADDRESS (N, M) |

FIG. 6

EQUAL ACCESS TO INTER-EXCHANGE CARRIERS IN A MOBILE WIRELESS PACKET DATA COMMUNICATION SYSTEM

FIELD OF THE INVENTION

The present invention relates generally to the communication of data packets using wireless mobile communication systems, and, in particular, to providing users of such systems with equal access to long distance or inter-exchange carriers in such systems.

BACKGROUND OF THE INVENTION

Recently, much attention has been focused on providing wireless packet data service to mobile data communication users. For example, "Cellular Digital Packet Data System Specification," Release 1.0 (Jul. 19, 1993), describes a connectionless, multi protocol network service that provides peer network wireless extension to existing data networks and in which one or both ends of the data communications may be a mobile end system.

Like voice networks, data communication networks typically have more than one path between two endpoints. Data network equipment may use protocols such as the Routing Information Protocol and the Open Shortest Path First to determine what those paths are and to determine which path represents the best route between a given pair of end systems. These protocols, however, run counter to the notion of equal access which would provide non-discriminatory exchange access to inter-exchange carriers, and which would allow a user or subscriber of the network services to choose the route by which the data is communicated between end systems. Equal access would permit a subscriber to select the route by which data is communicated at least with respect to those paths for which the subscriber pays.

In voice communication networks, a subscriber may choose a long distance carrier at the time he signs up for service. The subscriber also may change the long distance carrier at any time simply by contacting the local service provider. Furthermore, a subscriber may select a long distance carrier on a per-call basis.

Packet data networks are, however, connectionless by nature. In other words, packets of data may be exchanged between any pair of end systems at any time without explicitly establishing a connection. Packet data networks, therefore, pose unique problems in determining how to permit a subscriber to choose the inter-LATA (Local Access Transport Area) data carrier or inter-exchange carrier which will transport its data between end systems.

SUMMARY OF THE INVENTION

The present invention discloses a mobile wireless packet data communication system which may suitably comprise a mobile wireless end system for sending and receiving data in a connectionless manner and which allows a subscriber to specify a preferred inter-exchange carrier for carrying data to and from the mobile wireless end system during a particular session. The system may also comprise a serving mobile data intermediate system for receiving from the mobile wireless end system an identifier corresponding to the preferred inter-exchange system and for sending an identifier corresponding to the preferred inter-exchange carrier to a home mobile data intermediate system associated with the mobile wireless end system. In addition, the system may comprise a home mobile data intermediate system, which must be accessed before the subscriber is permitted to use services provided by the communication system, where the home mobile data intermediate system confirms the subscriber's preferred inter-exchange carrier for the particular session to the serving mobile data intermediate system. A plurality of inter-exchange carriers are also included in the system for transmitting data in a connectionless manner between components of the communication system. The home mobile data intermediate system routes forward traffic during the particular session via the preferred inter-exchange carrier if the mobile wireless end system is located outside its fixed home area. Furthermore, the serving mobile data intermediate system routes reverse traffic during the particular session via the preferred inter-exchange carrier.

Other features and advantages of the present invention will be readily apparent by reference to the following detailed description and accompanying drawings.

BRIEF DESCRIPTION OF THE DRAWINGS

FIG. 3 illustrates the format of an "end system hello" message according to the principles of the present invention.

FIG. 4 illustrates the format of a "redirect request" message according to the principles of the present invention.

FIG. 5 illustrates the format of a "redirect confirm" message according to the principles of the present invention.

FIG. 6 illustrates an exemplary Mobile Data Intermediate System database which maps inter-exchange carrier identifiers to their corresponding boundary router addresses.

DETAILED DESCRIPTION OF THE INVENTION

Figure 1:
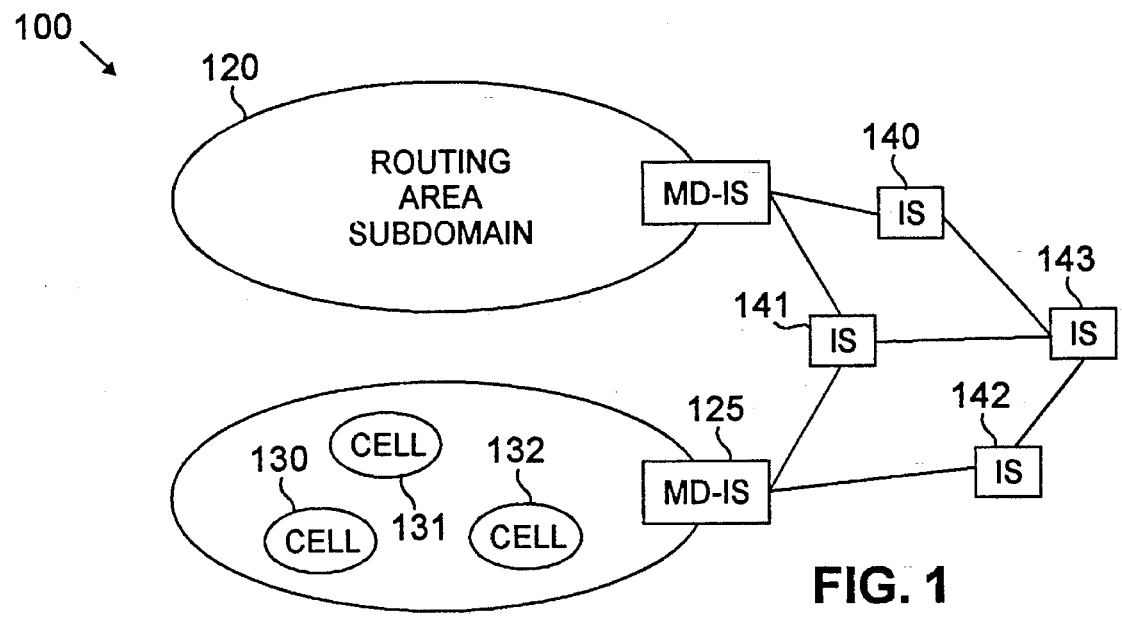
FIG. 1 shows the basic architecture of an exemplary packet data system in which the present invention is particularly advantageous.

FIG. 1 shows the basic architecture of an exemplary packet data system 100. Subscribers may gain access to the system 100 via a mobile end system (M-ES) device, such as a lap-top computer for example, having a built-in radio and antenna and having applications that can communicate to Internet using Internet Protocol data packets. M-ES devices are portable and may move between areas known as cells, such as cells 130–132, which may be defined by the geographic area covered by a Mobile Data Base Station (MDBS). An MDBS is responsible for detailed control of the radio interface, and an M-ES device communicates directly with an MDBS using appropriate radio frequencies.

An MDBS is under the control of a single Mobile Data Intermediate System (MD-IS), such as MD-IS 125, which performs routing functions based upon knowledge of the current location of an M-ES device and which hides the mobility of the M-ES device from conventional data inter-exchange networks or intermediate systems, such as intermediate systems 140–143. The combined geographic area of all MDBSs under control of a single MD-IS defines a routing area subdomain, such as subdomain 120.

An MD-IS which covers the cell in which an M-ES device is currently located may be referred to as a Serving MD-IS. Every M-ES device, however, also is logically a member of a fixed home area covered by a Home MD-IS. The Home MD-IS serves an authorization function and typically contains a subscriber directory profile which must be accessed before a subscriber will be permitted to use the services of the system 100. Furthermore, when a subscriber communicates, for example, with a fixed end system (F-ES) such as, for example, a personal computer, forward traffic flows from the F-ES to the M-ES via the Home MD-IS and the Serving MD-IS. Reverse traffic flows from the M-ES to the F-ES via the Serving MD-IS. If the subscriber is currently located in his fixed home area, then the Home MD-IS and the Serving MD-IS are the same piece of equipment. In such a situation, reverse traffic must flow through an inter-exchange carrier only if the F-ES is located in an area other than the subscriber's fixed home area. If, however, the subscriber is located outside his fixed home area, then the Serving MD-IS and the Home MD-IS will be different, and data must flow via inter-exchange carriers for both forward and reverse traffic.

Figure 2:
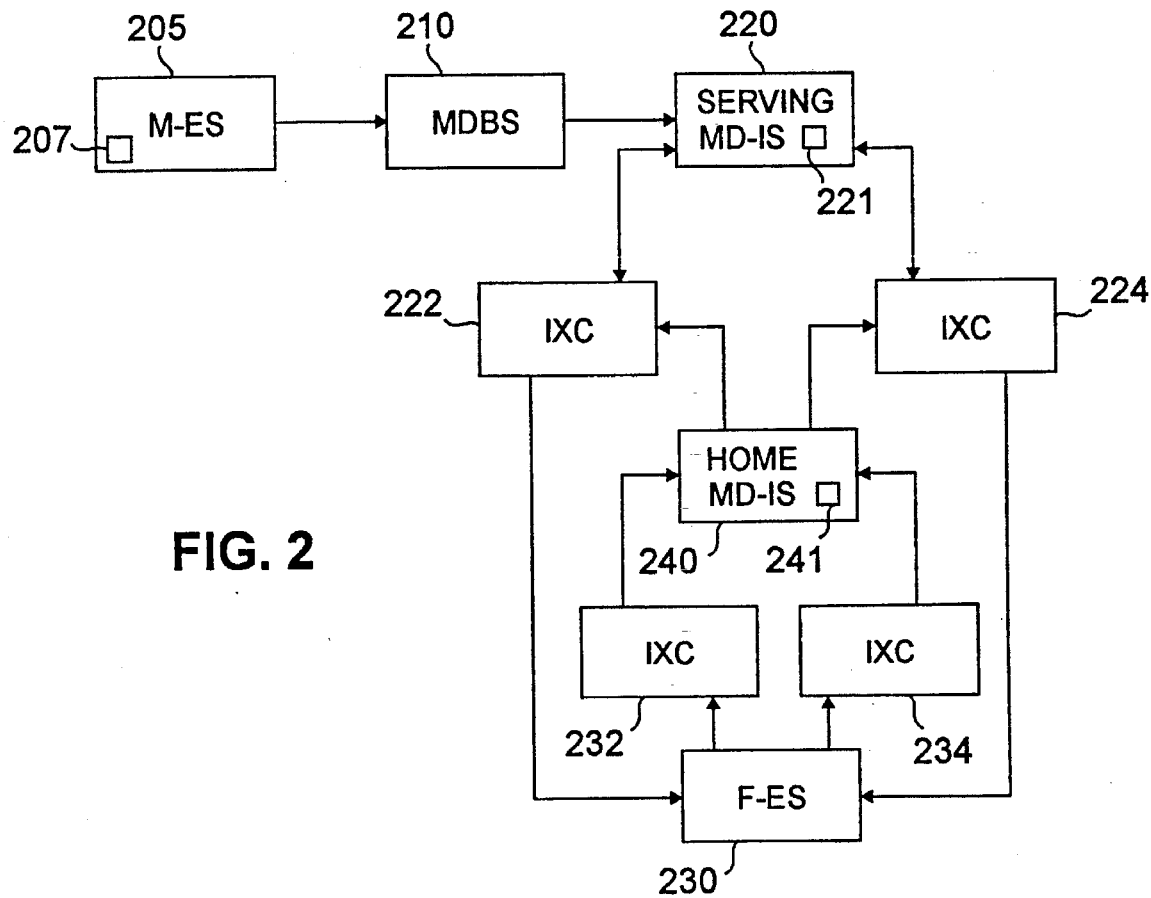
FIG. 2 is a block diagram illustrating various network paths associated with transmitting data between a mobile and a fixed end system.

FIG. 2 is a block diagram showing the various network paths associated with transmitting data between an M-ES 205 and an F-ES 230 where the M-ES 205 is not located in its fixed home area. It should be understood that the M-ES 205 can also send and receive data to or from other end systems, such as another M-ES, rather than the F-ES 230. Five major network paths may be identified. For data flowing from the M-ES 205 to the F-ES 230, there are two network paths to consider. First, data flows from the M-ES 205 to a Serving MD-IS 220 via an MDBS 210. Second, the data flows from the Serving MD-IS 220 to the F-ES 230 via one of a plurality of inter-exchange carriers (IXCs) 222, 224. For the sake of clarity, only two IXCs 222 and 224 are shown in FIG. 2 for transferring data from the Serving MD-IS 220 to the F-ES 230. There may, however, be more than two such IXCs.

The links between the MD-IS 220 and the MDBS 210 are part of the infrastructure of the system, and a carrier is free to use any facilities to implement those links. The concept of equal access, therefore, poses no unique requirements with respect to the first path. Similarly, it may be noted that there are no unique requirements with respect to links which exchange control data between the Serving MD-IS 220 and a Home MD-IS 240. The Serving MD-IS 220, however, controls routing on the second path, and the subscriber associated with the M-ES 205 pays for traffic on this path. The subscriber's preferred IXC, therefore, must be made known to the Serving MD-IS 220 to satisfy and implement the requirements of equal access.

For data flowing from the F-ES 230 to the M-ES 205, there are three network paths to consider. First, data flows from the F-ES 230 to the Home MD-IS 240 via one of a plurality of IXCs 232, 234. For the sake of clarity, only two IXCs 232 and 234 are shown in FIG. 2 for transferring data from the F-ES 230 to the Home MD-IS 240. There will, however, typically be more than two such IXCs. The second path serves to transfer the data from the Home MD-IS 240 to the Serving MD-IS 220 via one of the IXCs 222, 224. Finally, the third path serves to transfer the data from the Serving MD-IS 220 to the M-ES 205 via the MDBS 210.

The F-ES 230 controls the routing of forward flowing traffic on the first path, and the subscriber associated with the M-ES 205 does not pay for traffic on this path. The concept of equal access, therefore, does not require that the subscriber be permitted to select a preferred route or IXC for transferring data over this path. The third path for forward flowing traffic is the same as the first path for traffic flowing from the M-ES 205 to the F-ES 230, except in the reverse direction. As before, equal access poses no special requirements as to this link either. The subscriber, however, typically must pay for traffic on the second path even though the Home MD-IS 240 controls routing on this path. Equal access would allow the subscriber to select the IXC of his choice for this path as well. This requirement, however, means that the packet data system must route some data based upon the preference of the subscriber associated with the destination of the traffic, rather than the source.

In order to achieve a network structure and protocol which will allow equal access to be implemented for packet data service, several additions and modifications must be made to packet data networks known in the art. The changes that are explained in greater detail below permit a subscriber to choose the IXC used to route data on a per session basis. For these purposes, the beginning of a session may be defined as the time when the subscriber activates the software on the M-ES 205 and receives approval to use the network's services. The session ends when the subscriber deactivates the M-ES 205 or loses radio contact with the Serving MD-IS 220. Typically, the M-ES 205 may have multiple network entity identifiers (NEIs), where an NEI is the mechanism by which another end system identifies or addresses the M-ES in order to route data packets to the M-ES, and where all of the NEIs may be active simultaneously. Furthermore, the M-ES 205 can exchange data with multiple different end systems during a given session.

Typically, the Home MD-IS 230 associated with the subscriber's M-ES has a subscriber directory profile which is a memory unit containing specific information about the subscriber, such as the subscriber's name, the NEIs associated with the M-ES, and other pertinent information. This information is entered into the subscriber directory profile when the subscriber subscribes for service. In a preferred embodiment, this directory would be expanded to include an entry for the subscriber's default preferred IXC for use as further explained below.

Protocol Data Units (PDUs) are the units of information or messages that are exchanged to implement the protocol that offers a particular service. An exemplary PDU may contain, for example, an integral number of octets numbered in increasing order starting from octet 1. Each octet may contain, for example, eight bits numbered from 1 to 8, where bit 1 is the low-order bit. Some messages or PDUs are exchanged between an M-ES and a Serving MD-IS for the purpose of registering the M-ES for service with the system 100 during a particular session. These messages include, among others, an "end system hello" PDU and a "Hello confirm" PDU. Other messages are exchanged between the Serving MD-IS and the Home MD-IS in support of registration. These messages include, among others, a "redirect request" PDU and "redirect confirm" PDU. The PDUs that are exchanged between the different components of the system 100 are sent in a connectionless manner. According to the principles of the present invention, the above PDUs are modified to include an optional field that permits a subscriber to specify a preferred inter-exchange carrier (IXC) for a particular session.

FIG. 3 illustrates the format of an "end system hello" (ESH) PDU according to the principles of the present invention. The ESH message is used for exchanging routing and registration information between an M-ES, such as M-ES 205, and a Serving MD-IS, such as MD-IS 220. In particular, an ESH is sent by the M-ES 205 to register the existence and accessibility of a network entity identifier (NEI) associated with the particular M-ES 205. Octets 1 through N in the ESH illustrated in FIG. 3 are used in known fashion for indicating the PDU type, in this case an "end system hello", the length of the source address, and the network address of the source. The network address of the source identifies the NEI that is being indicated as present and accessible in the M-ES 205.

According to the present invention, octets N+1 through M of the ESH PDU in FIG. 3 are used to indicate the subscriber's preferred inter-exchange carrier (IXC) for the present session. Octets N+1 through M thus represent the "IXC Preference" field of the ESH PDU. In a preferred embodiment, at least sixteen bits, or two octets, would be allocated to this field. A unique identifier may be assigned to each IXC to ensure that the same values are universally observed by all subscribers and all components of the packet data network. Appropriate changes to the interface between the M-ES 205 and a subscriber unit associated with the M-ES 205 may be made to allow the subscriber to enter the identifier for his preferred IXC on a data entry unit 207, such as a keypad or keyboard connected to the M-ES 220. Thus, for example, when a subscriber activates the software on the M-ES 205, the subscriber may be prompted to enter the identifier for his preferred IXC as part of the ESH message.

Once the MD-IS 220 receives the ESH PDU, it sends a "redirect request" (RDR) PDU to the Home MD-IS 240 to register the existence and accessibility of the particular NEI. FIG. 4 illustrates an exemplary RDR PDU according to the present invention. Octets 1 through M are used according to known techniques for indicating the PDU type, a source address length, a source network address, a forwarding address length, and a forwarding network address. The forwarding network address parameter is an address associated with the Serving MD-IS 220 to which subsequent PDUs addressed to the M-ES 205 should be redirected. According to the present invention, octets M+1 through P represent the IXC Preference field and, as before, are used to transmit the identifier corresponding to the subscriber's preferred IXC.

The Home MD-IS 240 then sends a "redirect confirm" (RDC) PDU to acknowledge the presence of the M-ES 205 at its current location and to notify the Serving MD-IS 220 of the Home MD-IS's willingness or ability to provide network forwarding service at its current location. An exemplary RDC PDU according to the present invention is illustrated in FIG. 5. Octets 1 through N are used for the PDU type, a destination address length, and a destination network address. The destination network address parameter is the NEI of the M-ES that was announced in a previous RDR PDU. Octets N+1 through M represent the IXC Preference field for the RDC message and are used, according to the present invention, to indicate the identifier corresponding to the subscriber's preferred IXC.

The contents of octets N+1 through M of the RDC PDU depend upon whether the subscriber has chosen to indicate a preferred IXC for the current session. If the subscriber has not selected a preferred IXC for the current session by indicating the choice in the IXC Preference field of the ESH PDU, then octets N+1 through M contain the identifier corresponding to the subscriber's default preferred IXC as stored in the subscriber directory profile. If, however, the subscriber has indicated a preferred inter-exchange carrier for the current session in the IXC Preference field of the ESH PDU, then the Home MD-IS considers the IXC preference in the RDR message to be of higher priority than any other IXC preference information in the subscriber directory. In such a situation, octets N+1 through M of the RDC message contain the subscriber's preferred IXC as indicated in the IXC Preference field of the ESH message.

Once the MD-IS 220 receives the RDC message from the Home MD-IS 240, both the Serving MD-IS 220 and the Home MD-IS 240 retain in respective memory units the preferred inter-exchange carrier information for the duration of the session. The MD-IS 220 typically also sends a "hello confirm" (ISC) PDU to acknowledge the existence of the M-ES 205 and to notify the M-ES 205 of the Serving MD-IS's willingness or ability to provide network service. In a preferred embodiment, the ISC PDU would also be modified to include an optional field which would indicate whether or not the preferred carrier is accessible to the Home MD-IS 240 and the Serving MD-IS 220. If the preferred carrier chosen by the subscriber for the current session is not available, then the optional field would indicate that service using the preferred carrier is denied. Alternatively, the optional field would indicate that service may be provided using an alternate carrier.

It should be understood that the order and length of the PDU parameters discussed above may vary. There may also be additional parameters included in some PDUs.

Once the M-ES 205 receives an indication that packet data service will be provided for the current session using a particular preferred inter-exchange carrier, the actual data packets must be routed to the desired destination via the preferred IXC. Data packets may be transmitted from the MD-IS 220 or the MD-IS 240 to the proper boundary router of the preferred IXC by Loose Source Routing (LSR) as defined in "Internet Protocol," RFC 791, DARPA Internet Program Protocol Specification, Sept. 1981. Alternatively, the data packets may be transmitted using an encapsulation approach by which the data packets are carried in an information field of a new packet addressed directly to a router on the boundary of the preferred IXC.

In order to route data packets via the subscriber's preferred IXC, each MD-IS, such as the Home MD-IS 240 and Serving MD-IS 220, is provided with a new database or look-up table, 241 and 221 respectively, that maps each inter-exchange carrier identifier to the corresponding forwarding or boundary router associated with the inter-exchange carrier. FIG. 6 illustrates such a representative database 600 which may be established in a memory unit set up through administrative means and which stores the identifier-to-boundary router address mapping. A point of presence or boundary router, which is the location where the local carrier connects to the IXC, typically depends upon the particular cell in which the M-ES is presently located. In such a situation, the database 610 would be a two-dimensional array, as shown in FIG. 6, which indicates the forwarding or boundary router address for the subscriber's preferred IXC based upon the IXC identifier specified in the IXC preference fields and the cell in which the M-ES is presently located. It should be understood that the contents of the database depend upon the particular configuration of the MD-IS and typically will be different for each MD-IS.

Known wireless packet data communication systems include a traffic matrix segment associated with each MD-IS for accounting and billing purposes. The traffic matrix segment contains accounting information collected by the MD-IS and typically consists of a header and multiple rows of accounting information. During specified periods of time, each MD-IS keeps track of and records information regarding the traffic which it bears. The recorded information typically includes a count of the total number of data packets and the total number of data octets that were sent during a particular period and that have certain specified attributes. The attributes may be specified in a header and rows, where the header specifies attributes common to all rows and where each row defines a unique set of attributes. Typical attributes include, for example, the direction in which the packet data is flowing and the network entity identifier of the M-ES, among others. According to a preferred embodiment of the present invention, an additional field may be added to the attribute definitions of each row in the traffic matrix segment in order to facilitate billing information by inter-exchange carrier.

It should be understood that when the subscriber is located in his home area and wishes to communicate with an F-ES that is located outside the home area, the subscriber may also specify a preferred IXC for the session in the same manner as described above. In other words, the identifier corresponding to the preferred IXC would be included in the IXC Preference field of the end system hello message. In this situation, however, the Serving MD-IS and the Home MD-IS would be the same piece of equipment. The redirect request and the redirect confirm messages would, therefore, not need to be sent. The Home MD-IS would simply use the information received in the IXC Preference field of the end system hello message and the IXC identifier-to-boundary router address mapping database to route the data to the F-ES via the specified inter-exchange carrier.

Although the present invention has been described with reference to specific embodiments, other arrangements within the scope and spirit of the present invention will be readily apparent to persons of ordinary skill in the art. The present invention is, therefore, limited only by the appended claims.

I claim:

1. A mobile wireless packet data communication system for communicating in a connectionless manner comprising:
    a mobile wireless end system, having a fixed home area, for sending and receiving data in a connectionless manner and which allows a subscriber to specify a preferred inter-exchange carrier for carrying data to and from said mobile wireless end system during a particular session;
    a serving mobile data intermediate system for receiving from said mobile wireless end system information identifying said preferred inter-exchange system and for sending information identifying said preferred inter-exchange carrier to a home mobile data intermediate system associated with said mobile wireless end system;
    a home mobile data intermediate system, which must be accessed before the subscriber is permitted to use services provided by said communication system, where said home mobile data intermediate system confirms the subscriber's preferred inter-exchange carrier for the particular session to the serving mobile data intermediate system; and
    a plurality of inter-exchange carriers for transmitting data in a connectionless manner between components of said communication system,
    where the serving mobile data intermediate system routes reverse traffic during the particular session via said preferred inter-exchange carrier;
    and where the home mobile data intermediate system routes forward traffic during the particular session via said preferred inter-exchange carrier if the mobile wireless end system is located outside its fixed home area.

2. The communication system of claim 1 wherein an identifier corresponding to the subscriber's preferred inter-exchange carrier is included in an IXC preference field of specified protocol data units exchanged between components of said communication system.

3. The communication system of claim 2 wherein the identifier is included in the IXC preference field of the specified protocol data units during a registration procedure for said mobile wireless end system.

4. The communication system of claim 3 wherein the identifier corresponding to the subscriber's preferred inter-exchange carrier is included in an IXC Preference field of an end system hello protocol data unit sent from the mobile wireless end system to the serving mobile data intermediate system.

5. The communication system of claim 4 wherein the identifier is included in an IXC Preference field of a redirect request protocol data unit sent from the serving mobile data intermediate system to the home mobile data intermediate system.

6. The communication system of claim 5 wherein the identifier is included in an IXC Preference field of a redirect confirm protocol data unit sent from the home mobile data intermediate system to the serving mobile data intermediate system.

7. The communication system of claim 6 wherein the serving mobile data intermediate system and the home mobile data intermediate system each comprises a respective database that maps the identifier corresponding to said preferred inter-exchange carrier to a boundary router address associated with said preferred inter-exchange carrier.

8. The communication system of claim 7 wherein data packets are routed to respective boundary routers associated with said preferred inter-exchange carrier by Loose Source Routing.

9. The communication system of claim 7 wherein data packets are routed to respective boundary routers associated with said preferred inter-exchange carrier by an encapsulation approach.

10. The communication system of claim 7 wherein each of said databases is a two-dimensional array stored in respective memory units, where each array indicates the boundary router address for the subscriber's preferred inter-exchange carrier based upon the identifier corresponding to said preferred inter-exchange carrier and a particular cell in which said mobile wireless end system is located.

11. The communication system of claim 6 wherein said IXC Preference fields comprise at least sixteen bits.

12. The communication system of claim 6 wherein said home mobile data intermediate system comprises a subscriber directory profile having an entry for a default preferred inter-exchange carrier for said subscriber,
    and where the inter-exchange carrier corresponding to the identifier specified in said IXC Preference fields is given higher priority than said default preferred inter-exchange system.

13. The communication system of claim 6 wherein the identifier is included in an IXC Preference field of a hello confirm protocol data unit sent from the serving mobile data intermediate system to the mobile wireless end system.

14. The communication system of claim 7 wherein said mobile wireless end system comprises a data entry unit by which the subscriber can enter information identifying the subscriber's preferred inter-exchange carrier.

15. The communication system of claim 14 wherein said data entry unit is a keypad.

16. A method of providing equal access to inter-exchange carriers in a mobile wireless packet data communication system for communicating in a connectionless manner, said method comprising the steps of:
    specifying a preferred inter-exchange carrier for carrying data to and from a mobile wireless end system in a connectionless manner during a particular session;

sending information identifying said preferred inter-exchange carrier from said mobile wireless end system to a serving mobile data intermediate system, during a registration procedure for said mobile wireless end system;

sending information identifying said preferred inter-exchange carrier from said serving mobile data intermediate system to a home mobile data intermediate system during said registration procedure; and sending information confirming said preferred inter-exchange carrier from said home mobile data intermediate system to said serving mobile data intermediate system during said registration procedure.

17. The method of claim 16 wherein the step of sending information from said mobile wireless end system comprises the step of sending an end system hello protocol data unit containing an identifier corresponding to said preferred inter-exchange carrier in an IXC Preference field.

18. The method of claim 17 wherein the step of sending information from said serving mobile data intermediate system comprises the step of sending a redirect request protocol data unit containing an identifier corresponding to said preferred inter-exchange system in an IXC Preference field.

19. The method of claim 18 wherein the step of sending information from said home mobile data intermediate system comprises the step of sending a redirect confirm protocol data unit containing an identifier corresponding to said preferred inter-exchange carrier in an IXC Preference field.

20. The method of claim 19 wherein the step of specifying a preferred inter-exchange carrier comprises the step of entering information identifying said inter-exchange carrier into a data entry unit connected to said mobile wireless end system.

21. The method of claim 20 further comprising the steps of:

routing reverse traffic during the particular session from said serving mobile data intermediate system via said preferred inter-exchange carrier; and routing forward traffic during the particular session from said home mobile intermediate system via said preferred inter-exchange carrier if the mobile wireless end system is located outside its fixed home area.

22. The method of claim 21 wherein data packets are routed to respective boundary routers associated with said preferred inter-exchange carrier by Loose Source Routing.

23. The method of claim 21 wherein data packets are routed to respective boundary routers associated with said preferred inter-exchange carrier by an encapsulation approach.

* * * * *